United States Patent [19]

Mittelhäuser

[11] 4,078,758

[45] Mar. 14, 1978

[54] REAR VIEW MIRROR FOR AUTOMOTIVE VEHICLES

[76] Inventor: Bernhard Mittelhäuser, No. 57, D-3002 Wennebostel, Hanover, Germany

[21] Appl. No.: 728,409

[22] Filed: Sep. 30, 1976

[30] Foreign Application Priority Data

Oct. 1, 1975 Germany ............................ 2543801

[51] Int. Cl.² .............................................. A47G 1/24
[52] U.S. Cl. ................................................... 248/484
[58] Field of Search ............... 248/479, 481, 482, 483, 248/484, 485, 486, 487

[56] References Cited

U.S. PATENT DOCUMENTS

| 1,433,504 | 10/1922 | Grigsby | 248/487 |
| 2,533,475 | 12/1950 | Koonter | 248/484 |
| 2,594,056 | 4/1952 | Morgenstern | 248/481 |
| 3,474,998 | 10/1969 | Talbot | 248/484 |
| 3,667,718 | 6/1972 | Goslin et al. | 248/487 |
| 3,981,474 | 9/1976 | Szilagyi | 248/487 |

*Primary Examiner*—Robert A. Hafer
*Attorney, Agent, or Firm*—Walter Becker

[57] ABSTRACT

A rear view mirror, especially external rear view mirror, for automotive vehicles, in which the housing receiving the mirror body is provided with a holding structure for connecting the rear view mirror to an automotive vehicle, and in which the holding structure may be provided with an adjustable joint for the mirror. The housing is pivotally mounted on the holding structure so as selectively to be pivotable about an axis transverse to a side wall of the housing over an angle of about 180° relative to the holding structure and is arrestable in the respective adjusted position.

9 Claims, 2 Drawing Figures

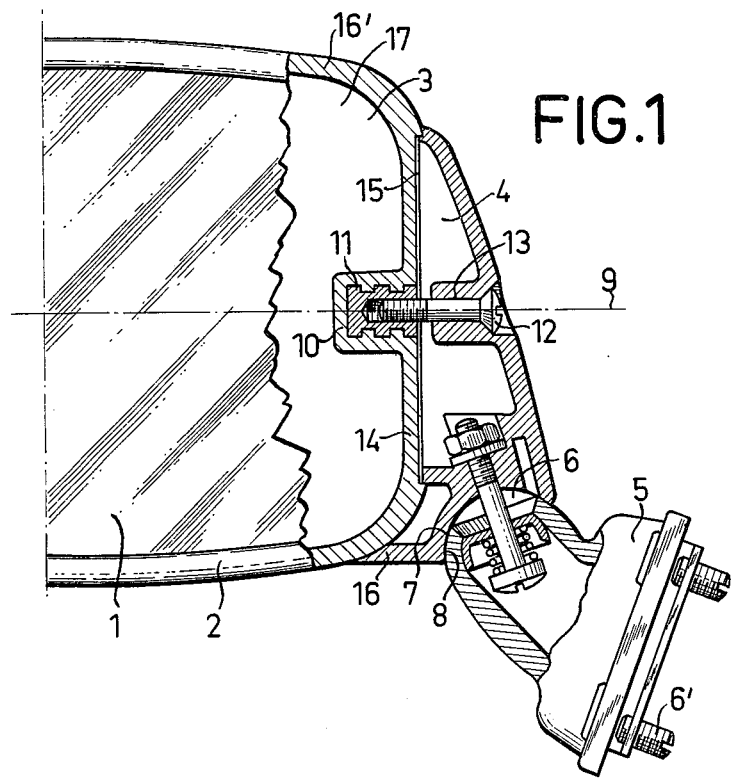
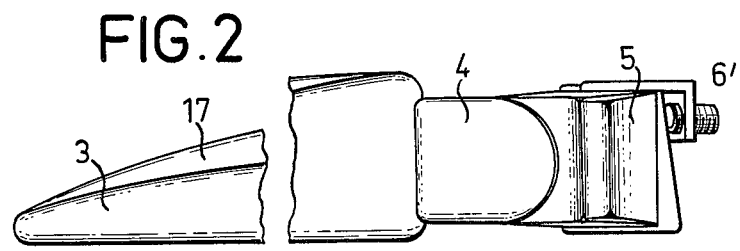

REAR VIEW MIRROR FOR AUTOMOTIVE VEHICLES

The present invention relates to a rear view mirror assembly for automotive vehicles and, more particularly, to an external rear view mirror assembly the housing of which accommodates the mirror body having a holder for attachment to the vehicle, preferably in the form of an arm.

It is an object of the present invention to develop a mirror assembly of the above kind which may be used on either the nearside or the offside of the vehicle.

According to the present invention there is provided a rear veiw mirror assembly, more particularly an external rear view mirror assembly, for automotive vehicles including a housing accommodating the mirror body, which housing is provided with a holder for attachment to a vehicle. This holder may be provided with an adjustable joint for the mirror in which the housing is pivotally mounted on the holder so as to be pivotable about a substantially horizontal axis through an angle of 180°, and is fixable.

The pivotal axis is preferably formed by a screw bolt which on the one hand permits the said pivotal movement while, on the other hand, allowing the housing to be fixed on the holder after the desired pivotal movement has been effected. If a joint, e.g. in the form of a ball joint, is to be used, the said pivotal mounting is providing between one part of the joint and the housing.

Moreover, the part of the holder facing the housing is adapted to the shape of the housing in such a manner that a smooth, continuous transition is produced.

Such a development of the mirror assembly of the invention makes it possible for the housing to be produced by injection molding or conventional molding if it is to be made e.g. in a mold from a suitable plastics material. It is also possible for the wall of the housing facing the holder to be made relatively thin, whereby a wall thickness is preferably chosen which corresponds substantially to the remaining wall thicknesses, thus with regard to its dimension, to correspond to the other wall portions.

The present invention is illustrated, by way of example, with reference to the accompanying drawing in which:

FIG. 1 is a view, partly in section, of a rear view mirror assembly according to the invention for an automotive vehicle.

FIG. 2 shows the mirror assembly of FIG. 1 in plan view.

The mirror assembly shown in the drawing is intended for mounting on the left-hand side (nearside) of the vehicle (when viewing the vehicle in the direction of its forward motion), and hence is intended for the driver of a vehicle with left-hand drive. However, the mirror assembly may also be located on the right-hand side (offside) of the vehicle, viz. as an additional mirror or as a mirror assembly for a vehicle with a right-hand drive.

The mirror body 1 has a substantially rectangular shape and is retained at its edges by the encircling edge 2 of a substantially cup-shaped housing 3, made of a hard-setting moldable plastics material. A holder in the shape of a short arm comprised of a triangular-shaped member 4 and a base 5 which is provided with securing means 6 for mounting on the outside of the vehicle, is used for mounting the housing 3 on the vehicle. The triangular-shaped member 4 and the base 5 form a ball joint 6 of known structure at the surfaces mutually facing one another. The socket 7 is thus located on the shaped member 4 and the ball 8 on the base 5.

The cross central axis of the housing 3 is denoted by reference numeral 9. In the region of the axis, the housing 3 is provided with a thickened portion 10 having a threaded member 11 inserted therein, namely in such a manner that the longitudinal axis of the thread or the screw bolt 12 emgaging therein coincides with the axis 9. This screw bolt pass through a bore 13 of the shaped member 4. The housing 3 and the shaped member 4 are secured to each other by tightening the screw bolt 12. The wall 14 of the housing 3 facing the shaped member 4 moreover has a shallow recess 15 in which the shaped member 4 is fitted with frictional engagement. A projection 16 tapering into a point is provided on the lower edge of the shaped member 4 which ensures a harmonious, stepless transition from the shaped member 4 to the housing 3, whereby it is understood that the remaining edges of the shaped member merge continuously into the housing 3.

If the mirror assembly is to be used for the right-hand side of the vehicle, the screw bolt 12 is slackened, and the housing 3 is swivelled about the axis 9 through 180°. After the screw bolt 12 has been tightened and hence a tight connection between the shaped member 4 and the housing 3 has been produced, the mirror is usable on the other side of the vehicle.

The wall 14, with regard to its thickness, may be dimensioned to correspond to the thickness of the other side walls 16' and the rear wall of the housing 3 which is denoted by the reference numeral 17.

It is further preferable that the shaped member 4 and the base 5 are open towards the housing 3 and the securing means 6 respectively. Therefore a simple mounting of the parts (bolt with screw connection, pressing spring and washers) necessary to form the ball joint 6 is possible.

The invention moreover is preferably used in such mirrors in which the holder for the housing (arm) does not extend in the direction of the axis 9 but at an angle thereto, preferably diagonally downwards.

It is, of course, to be understood that the present invention is, by no means, limited to the specific showing in the drawing but also comprises any modifications within the scope of the appended claims.

What I claim is:

1. A rear view mirror, especially external rear view mirror, suitable for mounting selectively equally well on both of opposite sides of automotive vehicles, which includes in combination: a housing having a first side wall and including a corner therewith, a mirror body arranged within said housing, holding means including a base and a triangular-shaped member detachably connected to said side wall of said housing for connecting said mirror with the base on to an automotive vehicle, a ball joint provided between the base and the triangular-shaped member at a location near the corner of said housing for said mirror body, said housing being pivotable relative to said holding means by an angle of about 180° about an axis transverse to said side wall, and said holding means including means for arresting said housing relative to said holding means in an adjusted position within the range of said 180° angle, said axis about which said mirror is pivotable relative to said holding means being the transverse central axis of said housing, said housing and said mirror body having about the contour of a rectangle, and said first side wall of said housing forming one of the shorter sides of the housing rectangle, and said pivot angle being substantially parallel to the longer sides of said housing rectangle.

2. A rear view mirror in combination according to claim 1, in which said holding and arresting means include a screw bolt coupling with the axis of said screw bolt being in alignment with said pivot axis of said housing.

3. A rear view mirror in combination according to claim 1, in which said housing in addition to said first side wall has other side walls and in which said first side wall has a wall thickness corresponding to the wall thickness of said other side walls.

4. A rear view mirror in combination according to claim 1, in which said holding means and said housing merge with each other in a step-free manner.

5. A rear view mirror in combination according to claim 1, in which said first side wall has a recess positively engaged by said holding means.

6. A rear view mirror in combination according to claim 1, in which said holding means includes: a first holding member detachably connected to said first side wall, and a second holding member for connection to an automotive vehicle, one of said holding members forming a socket and the other holding member having a spherical extension forming a ball joint with said socket, and connecting means extending through said ball joint and accessible at east through one of said holding members for interconnecting said holding members.

7. A rear view mirror according to claim 1, in which said housing and said mirror body have about the contour of a rectangle, and in which said first side wall of said housing forms one of the shorter sides of the housing rectangle, and in which said pivot angle is substantially parallel to the longer sides of said housing rectangle.

8. A rear view mirror in combination according to claim 6, in which said first holding member in cross section substantially forms a triangle with said first side wall of said housing in cross section.

9. A rear view mirror in combination according to claim 6, in which said first holding member has an extension engaging said housing from below.

* * * * *